(12) United States Patent
Clark et al.

(10) Patent No.: US 8,120,291 B2
(45) Date of Patent: Feb. 21, 2012

(54) DRIVE SYSTEM FOR ELECTRICALLY OPERATED VEHICLE

(75) Inventors: Warren W. Clark, Evans, GA (US); Oliver A. Bell, Aiken, SC (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 12/896,967

(22) Filed: Oct. 4, 2010

(65) Prior Publication Data

US 2011/0106357 A1    May 5, 2011

Related U.S. Application Data

(63) Continuation of application No. 12/487,695, filed on Jun. 19, 2009, now Pat. No. 7,825,616, which is a continuation of application No. 11/966,289, filed on Dec. 28, 2007, now Pat. No. 7,560,882, which is a continuation of application No. 11/260,867, filed on Oct. 27, 2005, now Pat. No. 7,332,881.

(60) Provisional application No. 60/623,149, filed on Oct. 28, 2004.

(51) Int. Cl.
*H02P 1/00* (2006.01)

(52) U.S. Cl. ........ 318/139; 318/440; 318/376; 318/375; 303/152; 303/124; 303/3; 303/15

(58) Field of Classification Search .................. 318/139, 318/400.01, 362, 364, 432, 445, 86, 159, 318/703, 757, 727, 700; 303/3, 15, 124, 303/152

See application file for complete search history.

(56) References Cited

U.S. PATENT DOCUMENTS

| | | | |
|---|---|---|---|
| 4,130,172 | A | 12/1978 | Moody |
| 4,295,687 | A | 10/1981 | Becker et al. |
| 4,313,080 | A | 1/1982 | Park |
| 4,347,907 | A | 9/1982 | Downing, Jr. |
| 4,378,855 | A | 4/1983 | Haub et al. |
| 4,673,852 | A | 6/1987 | Geiger |
| 4,687,976 | A | 8/1987 | Shimizu |
| 4,694,210 | A | 9/1987 | Elliott et al. |

(Continued)

FOREIGN PATENT DOCUMENTS

EP    0664273 A1    7/1995

(Continued)

OTHER PUBLICATIONS

Chinese Office Action for Chinese Application No. 200510119164.7, dated May 9, 2008, and English translation thereof.

(Continued)

*Primary Examiner* — Rita Leykin
(74) *Attorney, Agent, or Firm* — Harness, Dickey & Pierce, P.L.C.

(57) ABSTRACT

A drive system is provided for a utility vehicle and includes an alternating-current (AC) motor for providing a drive torque. An AC motor controller receives a battery voltage signal, throttle pedal position signal, brake pedal position signal, key switch signal, forward/neutral/reverse (FNR) signal, and run/tow signal indicative of the utility vehicle being configured to be driven and being configured to be towed. The AC motor controller generates an AC drive signal for the AC motor, wherein the AC drive signal is based on the battery voltage signal, throttle pedal position signal, brake pedal position signal, key switch signal, FNR signal, and run/tow signal.

24 Claims, 5 Drawing Sheets

U.S. PATENT DOCUMENTS

| | | |
|---|---|---|
| 4,698,562 A | 10/1987 | Gale et al. |
| 4,730,151 A | 3/1988 | Florey et al. |
| 4,763,053 A | 8/1988 | Rabe et al. |
| 4,800,977 A | 1/1989 | Boegli et al. |
| 4,809,803 A | 3/1989 | Ahern et al. |
| 4,817,748 A | 4/1989 | Murata et al. |
| 4,843,268 A | 6/1989 | Hovorka |
| 4,884,649 A | 12/1989 | Onishi et al. |
| 4,905,544 A | 3/1990 | Ganoung |
| 4,934,472 A | 6/1990 | Bloor et al. |
| 4,951,769 A | 8/1990 | Kawamura et al. |
| 5,004,080 A | 4/1991 | Wada et al. |
| 5,020,645 A | 6/1991 | Sasa |
| 5,034,670 A | 7/1991 | Tominaga et al. |
| 5,079,488 A | 1/1992 | Harms et al. |
| 5,092,417 A | 3/1992 | Oslapas |
| 5,096,011 A | 3/1992 | Oslapas |
| 5,099,186 A | 3/1992 | Rippel et al. |
| 5,101,924 A | 4/1992 | Yamagiwa et al. |
| 5,151,641 A | 9/1992 | Shamoto et al. |
| 5,172,784 A | 12/1992 | Varela, Jr. |
| 5,192,899 A | 3/1993 | Simpson et al. |
| 5,200,661 A | 4/1993 | Shramo et al. |
| 5,219,034 A | 6/1993 | Wortham |
| 5,222,572 A | 6/1993 | Yamagiwa et al. |
| 5,258,697 A | 11/1993 | Ford et al. |
| 5,280,211 A | 1/1994 | Freise et al. |
| 5,294,853 A | 3/1994 | Schluter et al. |
| 5,310,016 A | 5/1994 | Rudelle et al. |
| 5,349,535 A | 9/1994 | Gupta |
| 5,355,749 A | 10/1994 | Obara et al. |
| 5,365,153 A | 11/1994 | Fujita et al. |
| 5,365,431 A | 11/1994 | Minezawa et al. |
| 5,376,869 A | 12/1994 | Konrad |
| 5,406,154 A | 4/1995 | Kawaguchi et al. |
| 5,409,074 A | 4/1995 | Wilson et al. |
| 5,419,406 A | 5/1995 | Kawamoto et al. |
| 5,432,383 A | 7/1995 | Kawamura et al. |
| 5,438,228 A | 8/1995 | Couture et al. |
| 5,449,962 A | 9/1995 | Shichijyo et al. |
| 5,460,234 A | 10/1995 | Matsuura et al. |
| 5,465,806 A | 11/1995 | Higasa et al. |
| 5,471,384 A | 11/1995 | Nakashima et al. |
| 5,473,233 A | 12/1995 | Stull et al. |
| 5,480,220 A | 1/1996 | Kumar |
| 5,487,438 A | 1/1996 | Kinoshita et al. |
| 5,489,003 A | 2/1996 | Ohyama et al. |
| 5,492,192 A | 2/1996 | Brooks et al. |
| 5,501,292 A | 3/1996 | Kawashima et al. |
| 5,504,378 A | 4/1996 | Lindberg et al. |
| 5,532,671 A | 7/1996 | Bachman et al. |
| 5,549,172 A | 8/1996 | Mutoh et al. |
| 5,559,381 A | 9/1996 | Bosley et al. |
| 5,562,178 A | 10/1996 | Worden et al. |
| 5,565,760 A | 10/1996 | Ball et al. |
| 5,567,991 A | 10/1996 | Schantz et al. |
| 5,568,024 A | 10/1996 | Suzuki |
| 5,573,090 A | 11/1996 | Ross |
| 5,583,406 A | 12/1996 | Mutoh et al. |
| 5,586,613 A | 12/1996 | Ehsani |
| 5,615,933 A | 4/1997 | Kidston et al. |
| 5,619,085 A | 4/1997 | Shramo |
| 5,619,107 A | 4/1997 | Shinohara et al. |
| 5,629,603 A | 5/1997 | Kinoshita et al. |
| 5,633,544 A | 5/1997 | Toida et al. |
| 5,669,470 A | 9/1997 | Ross |
| 5,672,920 A | 9/1997 | Donegan et al. |
| 5,678,646 A | 10/1997 | Fliege et al. |
| 5,678,760 A | 10/1997 | Muso et al. |
| 5,690,185 A | 11/1997 | Sengel |
| 5,696,680 A | 12/1997 | Ichioka et al. |
| 5,707,115 A | 1/1998 | Bodie et al. |
| 5,710,699 A | 1/1998 | King et al. |
| 5,711,388 A | 1/1998 | Davies et al. |
| 5,730,675 A | 3/1998 | Yamaguchi et al. |
| 5,744,895 A | 4/1998 | Seguchi et al. |
| 5,764,009 A | 6/1998 | Fukaya et al. |
| 5,789,824 A | 8/1998 | Selfors et al. |
| 5,789,825 A | 8/1998 | Selfors et al. |
| 5,789,877 A | 8/1998 | Yamada et al. |
| 5,796,224 A | 8/1998 | Hayashi et al. |
| 5,801,498 A | 9/1998 | Kusano et al. |
| 5,804,973 A | 9/1998 | Shinohara et al. |
| 5,807,205 A | 9/1998 | Odaka et al. |
| 5,808,428 A | 9/1998 | Ito et al. |
| 5,814,957 A | 9/1998 | Yoshida et al. |
| 5,823,280 A | 10/1998 | Lateur et al. |
| 5,828,554 A | 10/1998 | Donegan et al. |
| 5,836,412 A | 11/1998 | Lyles et al. |
| 5,877,573 A | 3/1999 | Oberheide |
| 5,877,601 A | 3/1999 | Obara et al. |
| 5,901,801 A | 5/1999 | Toida et al. |
| 5,903,112 A | 5/1999 | Yamada et al. |
| 5,903,113 A | 5/1999 | Yamada et al. |
| 5,905,346 A | 5/1999 | Yamada et al. |
| 5,914,575 A | 6/1999 | Sasaki et al. |
| 5,915,495 A | 6/1999 | Kerlin et al. |
| 5,917,248 A | 6/1999 | Seguchi et al. |
| 5,920,161 A | 7/1999 | Obara et al. |
| 5,923,096 A | 7/1999 | Manak |
| 5,924,511 A | 7/1999 | Takata et al. |
| 5,941,328 A | 8/1999 | Lyons et al. |
| 5,944,132 A | 8/1999 | Davies et al. |
| 5,960,901 A | 10/1999 | Hanagan |
| 5,973,463 A | 10/1999 | Okuda et al. |
| 5,982,067 A | 11/1999 | Sebastian et al. |
| 5,991,683 A | 11/1999 | Takaoka et al. |
| 5,994,789 A | 11/1999 | Ochiai et al. |
| 6,002,221 A | 12/1999 | Ochiai et al. |
| 6,013,963 A | 1/2000 | Shelton, Jr. |
| 6,028,402 A | 2/2000 | Kumar et al. |
| 6,034,460 A | 3/2000 | Tajima et al. |
| 6,098,735 A | 8/2000 | Sadarangani et al. |
| 6,100,615 A | 8/2000 | Birkestrand |
| 6,107,761 A | 8/2000 | Seto et al. |
| 6,111,390 A | 8/2000 | Inaba et al. |
| 6,119,800 A | 9/2000 | McComber |
| 6,138,629 A | 10/2000 | Masberg et al. |
| 6,144,125 A | 11/2000 | Birkestrand et al. |
| 6,155,369 A | 12/2000 | Whittaker |
| 6,166,499 A | 12/2000 | Kanamori et al. |
| 6,183,389 B1 | 2/2001 | Tabata et al. |
| 6,194,799 B1 | 2/2001 | Miekka et al. |
| 6,209,672 B1 | 4/2001 | Severinsky |
| 6,218,804 B1 | 4/2001 | Toriyama et al. |
| 6,226,582 B1 | 5/2001 | Adsett et al. |
| 6,234,930 B1 | 5/2001 | Kaneko et al. |
| 6,236,172 B1 | 5/2001 | Obara et al. |
| 6,242,873 B1 | 6/2001 | Drozdz et al. |
| 6,244,427 B1 | 6/2001 | Syverson |
| 6,252,331 B1 | 6/2001 | Mildice et al. |
| 6,255,798 B1 | 7/2001 | Obara et al. |
| 6,258,001 B1 | 7/2001 | Wakuta et al. |
| 6,269,895 B1 | 8/2001 | Tanuguchi et al. |
| 6,278,256 B1 | 8/2001 | Aoyama et al. |
| 6,328,123 B1 | 12/2001 | Niemann et al. |
| 6,333,610 B1 | 12/2001 | Meschik et al. |
| 6,342,769 B1 | 1/2002 | Birkestrand et al. |
| 6,351,050 B1 | 2/2002 | Coles et al. |
| 6,369,532 B2 | 4/2002 | Koenen et al. |
| 6,373,162 B1 | 4/2002 | Liang et al. |
| 6,373,206 B1 | 4/2002 | Morimoto et al. |
| 6,396,183 B1 | 5/2002 | Tajima et al. |
| 6,412,882 B1 | 7/2002 | Isono et al. |
| 6,422,001 B1 | 7/2002 | Sherman et al. |
| 6,424,157 B1 | 7/2002 | Gollomp et al. |
| 6,425,365 B1 | 7/2002 | Peters et al. |
| 6,429,613 B2 | 8/2002 | Yanase et al. |
| 6,434,475 B2 | 8/2002 | Kaneko et al. |
| 6,443,543 B1 | 9/2002 | Chiang |
| 6,456,909 B1 | 9/2002 | Shimada et al. |
| 6,459,962 B2 | 10/2002 | Ulrich et al. |
| 6,464,026 B1 | 10/2002 | Horsley et al. |
| 6,469,462 B2 | 10/2002 | Shimane et al. |
| 6,476,571 B1 | 11/2002 | Sasaki et al. |
| 6,478,101 B1 | 11/2002 | Taniguchi et al. |
| 6,479,917 B2 | 11/2002 | Yamazaki et al. |

| | | |
|---|---|---|
| 6,492,785 B1 | 12/2002 | Kasten et al. |
| 6,538,400 B2 | 3/2003 | Fowler et al. |
| 6,541,938 B2 | 4/2003 | Okamura et al. |
| 6,554,088 B2 | 4/2003 | Severinsky et al. |
| 6,556,460 B2 | 4/2003 | Ishida et al. |
| 6,591,173 B2 | 7/2003 | Nada |
| 6,598,693 B2 | 7/2003 | Honda et al. |
| 6,600,249 B2 | 7/2003 | Nelson et al. |
| 6,625,525 B2 | 9/2003 | Yoshino et al. |
| 6,626,504 B2 | 9/2003 | Harner et al. |
| 6,630,764 B1 | 10/2003 | Dube et al. |
| 6,636,788 B2 | 10/2003 | Tamagawa et al. |
| 6,647,325 B2 | 11/2003 | Shimazaki et al. |
| 6,651,762 B1 | 11/2003 | Hokanson et al. |
| 6,661,109 B2 | 12/2003 | Fukasaku et al. |
| 6,679,346 B2 | 1/2004 | Raftari et al. |
| 6,686,719 B2 | 2/2004 | Cochoy et al. |
| 6,757,599 B2 | 6/2004 | Nada |
| 6,871,919 B2 | 3/2005 | Anwar et al. |
| 6,917,180 B2 | 7/2005 | Harrison et al. |
| 6,963,186 B2 | 11/2005 | Hobbs |
| 6,973,880 B2 | 12/2005 | Kumar |
| 7,056,260 B2 | 6/2006 | Nakamori et al. |
| 7,560,882 B2 * | 7/2009 | Clark et al. .............. 318/139 |
| 2001/0023799 A1 | 9/2001 | Engelhard |
| 2002/0024267 A1 | 2/2002 | Sakamoto |
| 2002/0103055 A1 | 8/2002 | Tani et al. |
| 2002/0171324 A1 | 11/2002 | Smith et al. |
| 2003/0098185 A1 | 5/2003 | Komeda et al. |
| 2003/0136597 A1 | 7/2003 | Raftari et al. |
| 2003/0155807 A1 | 8/2003 | Tabor |
| 2004/0056616 A1 | 3/2004 | Honda |
| 2004/0100221 A1 | 5/2004 | Fu |
| 2004/0103719 A1 | 6/2004 | Raftari et al. |
| 2004/0104619 A1 | 6/2004 | Manaka |
| 2004/0169489 A1 | 9/2004 | Hobbs |
| 2005/0236207 A1 | 10/2005 | Gratzer |

FOREIGN PATENT DOCUMENTS

| | | |
|---|---|---|
| JP | 8-33103 | 2/1996 |
| JP | 10-257604 | 9/1998 |
| JP | 2000175311 A | 6/2000 |
| JP | 2002257216 A | 9/2002 |
| JP | 2003182610 A | 7/2003 |
| JP | 2003299205 A | 10/2003 |
| WO | 03/081538 A2 | 10/2003 |
| WO | 2004027530 A1 | 4/2004 |

OTHER PUBLICATIONS

Curtis, Curtis PMC Models 1236 & 1238 AC Induction Motor Controllers with VCL, 1236/38 Manual, p/n 37022, Rev A: May 2002.
E-Z-GO, Owner's Manual and Service Guide, Electric Powered Fleet Golf Cars & Personal Vehicles, 28645-G01-GB, Starting Model Year:2001, Revised Oct. 10, 2002.
Reva, Reva Service Manual, Reva Electric Car Co. Pvt. Ltd., Service Division, 2002.
Japanese Office Action for Japanese Patent Application No. 2005-315453 dated Apr. 21, 2011.

* cited by examiner

DRIVE SYSTEM FOR ELECTRICALLY OPERATED VEHICLE

CROSS-REFERENCES TO RELATED APPLICATIONS

This application is a continuation of U.S. patent application Ser. No. 12/487,695 filed on Jun. 19, 2009 as a continuation of U.S. patent application Ser. No. 11/966,289 filed on Dec. 28, 2007 as a continuation of U.S. patent application Ser. No. 11/260,867 filed on Oct. 27, 2005. This application claims the benefit of U.S. Provisional Application No. 60/623,149, filed on Oct. 28, 2004. The specifications of the above application are incorporated herein by reference in their entirety.

FIELD

The present disclosure relates generally to a brushless, alternating current (AC) drive system for providing motive power to drive wheels of an electrically operated vehicle.

BACKGROUND

The statements in this section merely provide background information related to the present disclosure and may not constitute prior art.

All electric motors, such as alternating current (AC) motors or direct current (DC) function on a principle that two magnetic fields in proximity to one another have a tendency to align. One way to induce a magnetic field is to pass current through a coil of wire. If two coils with current passing through them are in proximity to each other, the respective magnetic fields that are generated have a tendency to align themselves. If the two coils are between 0 and 180 degrees out of alignment, this tendency may create a torque between the two coils. An arrangement where one of these coils is mechanically fixed to a shaft and the other is fixed to an outer housing is known as an electric motor. The torque produced between these coils may vary with the current through the coils.

AC motors may encompass a wide class of motors, including single/multiphase, universal, servo, induction, synchronous, and gear motor types, for example. The magnetic field generated by AC motors may be produced by an electromagnet powered by the same AC voltage as the motor coil. The coils that produce the magnetic field are traditionally called the "field coils" while the coils and the solid core that rotates is called the armature coils.

AC motors may have some advantages over DC motors. Some types of DC motors include a device known as a commutator. The commutator ensures that there is always an angle between the two coils, so as to continue to produce torque as the motor shaft rotates through in excess of 180 degrees. The commutator disconnects the current from the armature coil, and reconnects it to a second armature coil before the angle between the armature coil and field coil connected to a motor housing reaches zero.

The ends of each of the armature coils may have contact surfaces known as commutator bars. Contacts made of carbon, called brushes, are fixed to the motor housing. A DC motor with a commutator and brushes may be known as a 'brushed' DC motor, for example. As the DC motor shaft rotates, the brushes lose contact with one set of bars and make contact with the next set of bars. This process maintains a relatively constant angle between the armature coil and the field coil, which in turn maintains a constant torque throughout the DC motor's rotation.

Some types of AC motors, known as brushless AC motors, do not use brushes or commutator bars. Brushed DC motors typically are subject to periodic maintenance to inspect and replace worn brushes and to remove carbon dust, which represents a potential sparking hazard, from various motor surfaces. Accordingly, use of a brushless AC motor instead of the brushed DC motor may eliminate problems related to maintenance and wear, and may also eliminate the problem of dangerous sparking. AC motors may also be well suited for constant-speed applications. This is because, unlike a DC motor, motor speed in an AC motor is determined by the frequency of the AC voltage applied to the motor terminals.

There are two distinct types of AC motors, AC synchronous motors and AC induction motors. A synchronous motor consists of a series of windings in the stator section with a simple rotating area. A current is passed through the coil, generating torque on the coil. Since the current is alternating, the motor typically runs smoothly in accordance with the frequency of the sine wave. This allows for constant, unvarying speed from no load to full load with no slip.

AC induction motors are generally the more common of the two AC motor types. AC induction motors use electric current to induce rotation in the coils, rather than supplying the rotation directly. Additionally, AC induction motors use shorted wire loops on a rotating armature and obtain the motor torque from currents induced in these loops by the changing magnetic fields produced in the field coils.

Conventional electric motor driven vehicles such as golf cars and small utility vehicles are DC powered, and primarily powered by a shunt-type DC drive system. The shunt-type DC motor has replaced many of the older series wound DC motors for powering vehicles such as golf cars. A shunt-type DC motor has armature and field windings connected in parallel to a common voltage source, a configuration which offers greater flexibility in controlling motor performance than series wound DC motors. However, these shunt type motors still present maintenance and potential spark hazard problems. It is not heretofore believed that a brushless AC drive system has been developed which provides the motive force for driving wheels of a vehicle such as a golf car.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. Throughout the disclosure, like elements are represented by like reference numerals, which are given by way of illustration only and thus are not limitative of the various embodiments.

DETAILED DESCRIPTION

Figure 1:
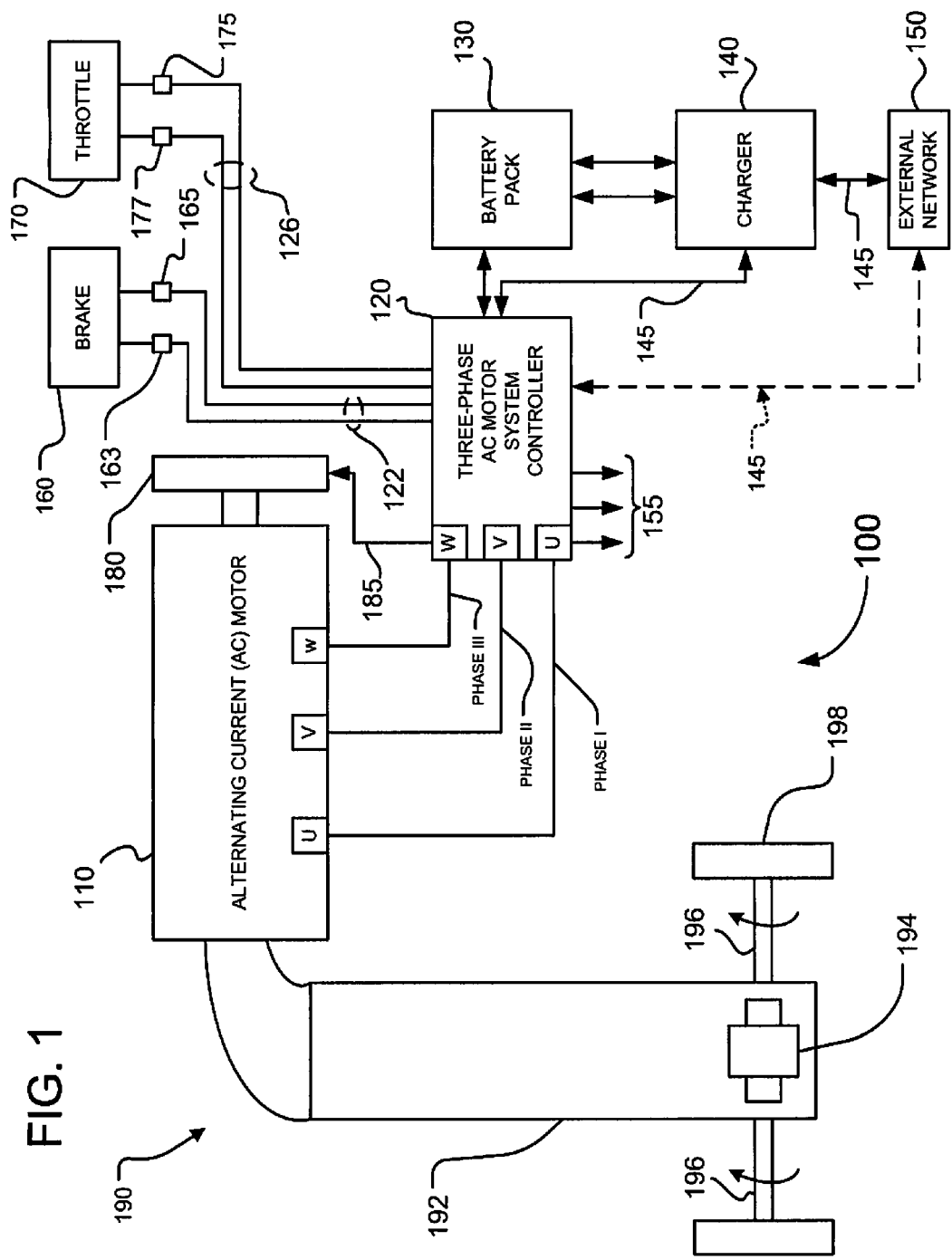
FIG. 1 is a block diagram an AC drive system in accordance with various embodiments.

FIG. 1 is an exemplary block diagram of an AC drive system in accordance with various embodiments. In FIG. 1, there is shown an AC drive system 100, which may include a three-phase (3φ) AC motor 110, such as an induction motor or permanent magnet motor, and a matched AC drive motor controller 120 to be used in conjunction with an electrically operated vehicle 190 such as a golf car and/or a small utility vehicle. As will be described in more detail below, AC drive system 100 may provide tractive power, service brake functionality, and recovery and conversion of kinetic energy from vehicle 190 motion to potential energy in the form of electromotive force (EMF).

Referring to FIG. 1, in response to motor controller 120, motor 110 may provide motive force to drive wheels 198 imparting motive force or tractive energy via axle 192 through locking differential 194 and shafts 196 to rear wheels 198. Motor 110 may be operatively connected to an electrically actuated brake 180 under the control of motor controller 120 via signal line 185 and/or motor 110. Additionally, throttle control for a throttle (accelerator pedal) 170 may be provided via a throttle position sensor 175 and a throttle enable sensor 177, based on signals received over lines 126 from motor controller 120. Further, AC drive system 100 may include a service brake pedal 160 to operatively control braking by motor 110 in accordance with signals from motor controller 120. Movement of service brake pedal 160 is detected by one or both of sensors which generate control signals sent to motor controller 120 via communication lines 122. Sensors associated with brake pedal 160 may include a brake position sensor 163 and a full stroke sensor 165, to be described in further detail below.

Motor controller 120 may be in operative communication with one or more of a portable battery pack 130, charger 140, an external network 150, and other external devices or outputs 155 such as a reverse alarm sensor via a direct connection or a controller area network (CAN) bus 145 and associated connector interfaces, as shown in FIG. 1. Operative control and data exchange between motor controller 120, charger 140 and external network 150 are described in further detail below.

The AC system logic for AC drive system 100 may include a series of drive inputs and drive outputs. The following describes exemplary inputs to and outputs from the system logic as implemented in intelligent devices such as motor controller 120. It will be understood by one skilled in the art that input and output parameters or signals other than described below may be implemented with the exemplary AC drive system.

Figure 2:
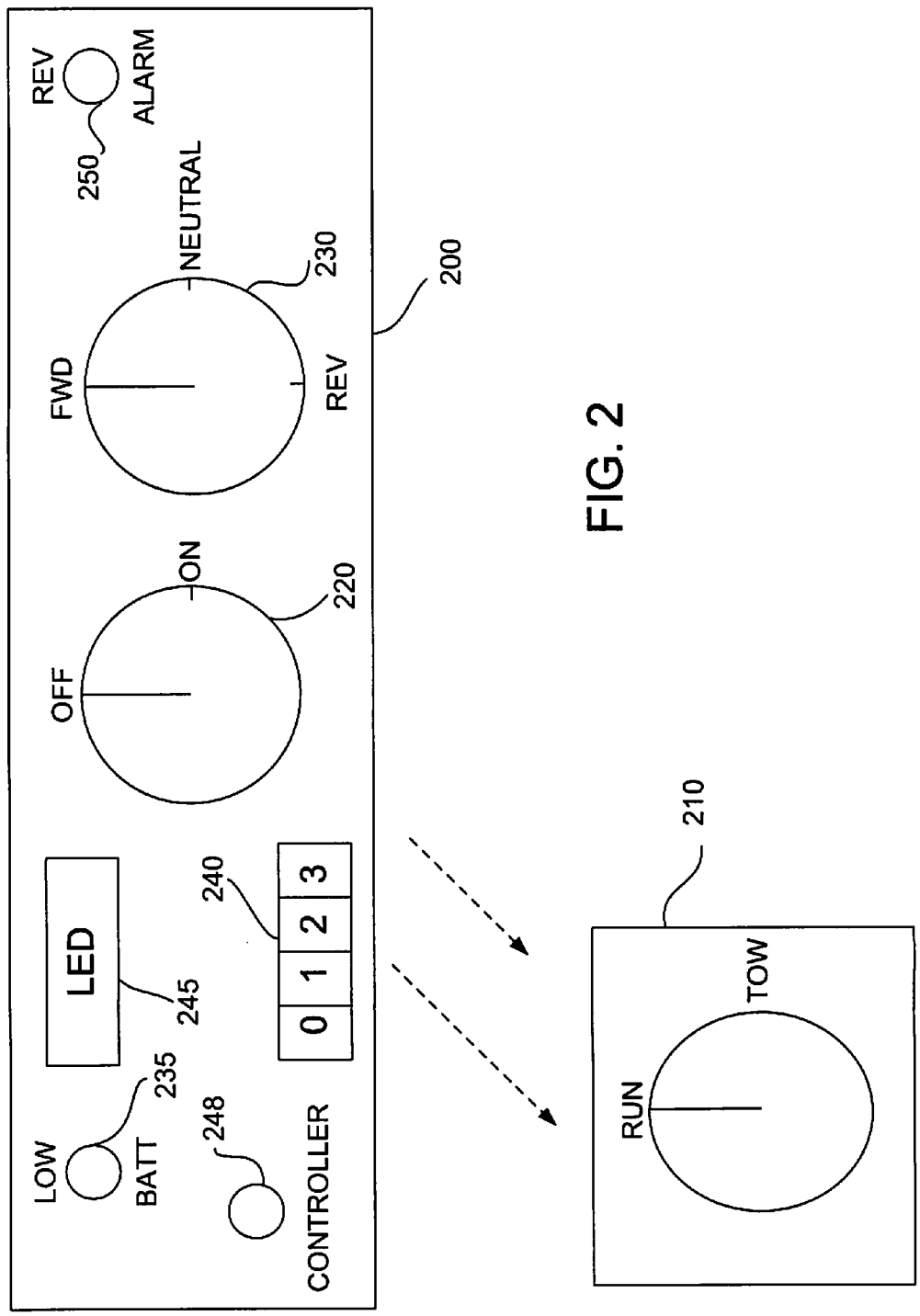
FIG. 2 is a block diagram of an instrument panel in accordance with various embodiments.

FIG. 2 is a block diagram of an exemplary instrument panel in accordance with various embodiments. Referring to FIG. 2, a suitable instrument panel 200 may include a key switch 220, forward, neutral and reverse (FNR) switch 230, low battery indicator 235, amp-hour meter 240, LED 245, controller indicator 248, and reverse alarm indicator 250. Controller indicator 248 may indicate a condition, such as normal status, warning, and the like, for AC controller 120 or other components of the AC motor control system. LED 245 may be embodied as a single LED or multiple LEDs and may be configured to display suitable numeric or alphanumeric error codes. The error codes may include, but are not limited to error codes related approaching threshold or warning conditions of AC motor 110, motor controller 120, battery pack 130, service brake pedal 160, electrically actuated brake 180, or the like.

Vehicle 190 may also include a suitable run/tow switch 210 provided at a desired location for actuation by an operator of vehicle 190. The run/tow switch 210 may be located on the vehicle 190 at a place that is convenient for towing, yet a location where the switch may not be easily activated from the operator's (or passenger's) position, so as to avoid a purposefully or inadvertently cycling of switch 210 during normal driving evolutions of the vehicle 190.

When the run/tow switch 210 is selected to RUN, motive power may be provided via motor controller 120 and motor 110 to drive vehicle 190. When the run/tow switch 210 is switched to TOW, the electric brake 180 may be de-energized for a time period sufficient to actuate electric brake 180 and motor controller 120, such as one (1) second, and may apply a given pulse width modulated (PWM) percentage, such as a 40% by way of example hold on the electric brake 180 thereafter. As will be described in greater detail herein, this may allow the vehicle 190 to be towed at speeds up to or slightly above rated motor speed, which may be approximately 4650 RPM for an exemplary golf car application. With the run/tow switch 210 in TOW, a towing mode may be enabled that provides zero wheel torque.

Another input to the system logic may be provided via a key switch 220 having ON/OFF switch positions. With the key switch 220 set to the ON position, drive logic power may be enabled to motor controller 120 and power may be enabled to the electric brake 180. Setting the key switch 220 to OFF position may disable the logic power to the motor controller 120 and de-energize the electric brake 180.

Actuation of the FNR switch 230 to FWD may enable drive logic power for selecting a forward drive direction. Forward speed may be up to rated motor speed, or a vehicle speed in accordance with the rated motor speed. Actuation of the FNR switch 230 to NEUTRAL may disable drive logic power for selecting either a forward drive direction or reverse drive direction, so as to place AC motor 110 in a free-wheeling mode at a relatively constant RPM (i.e., idle). Actuation of the FNR switch 230 to REV may enable drive logic power for selecting a reverse drive direction. This switch position may optionally sound a reverse alarm. Reverse direction speed may be desirably limited to less than the rated speed, such as 60% of maximum motor speed, or a vehicle speed of approximately 10 MPH.

Another drive input to the system logic may include a throttle position sensor 175, as shown in FIG. 1. The throttle position sensor 175 may be located in signal line 126 between the accelerator pedal or throttle 170 and motor controller 120 and may be configured to output an analog voltage that may be converted to a digital signal in the A/D converter of controller 120. The voltage may vary between about 0 to 5.0 volts in accordance with the position or depression of throttle 170. In an exemplary configuration, 0-0.5 volts may indicate a 0 RPM commanded speed and 4.5 volts or greater may indicate a maximum commanded motor speed. In other words, a 0.5 volt output corresponds to 0% commanded motor speed or zero RPM. A 4.5 or greater volt output corresponds to 100% commanded motor speed in the forward direction (4650 RPM) and approximately 60% commanded motor speed in the reverse direction (2790 RPM). The throttle position sensor 175 may be embodied as a suitable potentiometer or Hall Effect sensor, and may thus provide a limitation on actual speed to 100% of motor speed in either the forward or reverse directions.

Another drive input to the system logic may be via throttle enable sensor 177. The throttle enable sensor 177, also occasionally referred to as a pedal-up sensor, may sense one of a drive mode and a pedal-up mode, based on the position of the accelerator pedal or throttle 170. When sensing the drive mode (at any point the pedal is depressed) the throttle enable sensor 177 energizes a main contactor to enable operation of AC motor 110 and to energize the electric brake 180 so as to enable drive power, via motor controller 120 and motor 110, to wheels 198. If the pedal-up mode is sensed (indicating that the accelerator pedal is fully 'up' and not depressed', the main contactor may be de-energized to disable drive.

Accordingly, exemplary input conditions that may be met to provide motive power to wheels 198 could include the key switch 220 placed in ON and the FNR switch 230 selected to either the FWD or REV position, the run/tow switch 210 selected to RUN, brake position sensor 163 receiving a 0% braking command from motor controller 120, and a battery 130 state of charge (SOC) of at least 20%. These are merely exemplary conditions to provide motive power, other conditions may be set within the ordinary skill of the art.

Another drive input to system logic may be provided via brake position sensor 163. Similar to the throttle position sensor 175, the brake position sensor 163 is located in a signal line 122 between the brake pedal 160 and motor controller 120 and outputs an analog value (voltage) that is converted to a digital signal in the A/D converter of motor controller 120. For example, sensing of less than 0.5 volt output from brake position sensor 163 may represent 0% braking and the enabling of motive power to the wheels 198. Between 0.51 to 1.0 volts output, actual speed may be maintained via regenerative braking and no motive power may be applied to wheels 198, for example. Between 1.01 to 4.0 volt output, a proportional deceleration speed ramp may increase with increasing input voltage. The start and finish conditions may be adjustable, for example. For a 4.1 to 4.5 or greater volt output from brake position sensor 163, commanded motor speed may be 0% and the electric brake 180 may be de-energized (such as via a control signal sent by motor controller 120 over signal line 185, as shown in FIG. 1, for example) to enable electric brake 180 to apply a braking torque or braking pressure upon motor 110. The braking function may be tunable in accordance with course conditions, such as wet, dry, hilly, and flat terrain, and vehicle performance to provide a consistent feel to the braking operation.

The logic functions of the brake position sensor 163 may override and maintain priority over any throttle input to throttle 170, for example. The logic function for the brake position sensor 163 may operate with the key switch 220 to ON, the FNR switch 230 to either FWD or REV, and the run/tow switch 210 in either RUN or TOW, the throttle enable sensor 177 sensing either drive mode or pedal-up mode and the throttle position sensor 175 sensing commanded motor speed anywhere between 0 to 100%. A further condition may be any battery SOC value above 0%.

Another input to the system logic may be battery voltage. Motor controller 120 may monitor the battery pack 130 voltage under load or may monitor the internal resistance (impedance) of the battery pack 130 in order to determine the battery pack 130 state of charge (SOC). With the SOC between about 100% to 25%, controller 120 may enable motive power to drive the vehicle 190. With an SOC between about 24% and 20%, the logic in motor controller 120 may limit commanded speed to 40% maximum drive speed, or approximately 1860 RPM, or approximately 6 MPH to provide a limp-home capability. For a SOC less than 20%, no motive power is supplied to power vehicle 190. The logic may thus limit commanded speed to zero RPM, the electric brake 180 may be de-energized, and motor braking via motor 110 may be enabled to protect battery pack 130 from being too deeply discharged. The electric brake 180 may be energized by the run/tow switch being selected to TOW at this latter SOC range.

Table 1 summarizes exemplary drive inputs to the logic of motor controller 120.

TABLE 1

| Drive Inputs | | |
|---|---|---|
| Input | Position | Function |
| Run/Tow Switch 210 | Run | Must be selected to enable motive power to drive the vehicle. |
| | Tow | Energizes Electric brake 180 for 1 second and then applies 40% PWM hold on electric brake 180 thereafter. Allows the vehicle 190 to be towed at speeds up to and slightly above rated motor speed. (4650 rpm). Towing mode provides zero wheel torque. Towing occurs multiple times daily. External switching of the U, V, or W power wires is not required. |
| Key switch 220 ON/OFF | ON | Enables drive logic power to motor controller 120 and energizes electric brake 180 |
| | OFF | Disables logic power to the motor controller 120. De-energizes the electric brake 180. |
| Throttle Enable Sensor 177 | DRIVE | Energizes main contactor. De-energizes the electric brake 180. Enables drive. |
| | PEDAL-UP | De-energizes the main contactor. Disables drive. |
| Throttle Position sensor 175 | 0.5 V input | 0% commanded motor speed (0 rpm) |
| | 4.5 V input | 100% commanded motor speed (4650 rpm) FWD and (2790 rpm) REV Limit actual speed to 100% motor speed (4650 rpm) FWD and REV Other input conditions that may be met to provide motive power: Key switch 220 = ON and FNR |

TABLE 1-continued

Drive Inputs

| Input | Position | Function |
|---|---|---|
| | | switch = FWD or REV<br>Run/Tow switch 210 = Run<br>Brake position sensor 163 =<br>0% braking command<br>Battery SOC > 20% |
| Brake position sensor 163 | 0.5 V input | 0% braking, motive power is enabled. |
| | 0.51 V-1.0 V input | Maintain actual speed via regenerative braking - no motive power. |
| | 1.01 V-4.0 V input | Proportional deceleration speed ramp increases with increased input voltage (start and finish slope is adjustable). |
| | 4.01 V-4.5 V input | Commanded motor speed is 0% (0 rpm) De-energize[[s]] the electric brake.<br>This logic function has priority over throttle input.<br>Operates in the following conditions:<br>Key switch = ON and FNR switch = FWD or REV<br>Run/Tow switch 210 = Run or Tow<br>Throttle enable switch 177 = ENABLE or DISABLE<br>Throttle position sensor 175 = 0% to 100%<br>Battery SOC > 0% |
| Battery Voltage | | Monitor the battery pack 130 voltage under load or the internal resistance of the battery pack 130 to determine the battery pack State of Charge (SOC) |
| | SOC = 100% to 25%- | enables motive power to drive vehicle 190 |
| | SOC = 24% to 20% | Limits commanded speed to 40% maximum speed drive. (1860 rpm) |
| | SOC = 19% to 0% | Limits commanded speed to 0% (0 rpm). Electric brake 180 is De-energized. Motor braking is enabled. Electric brake 180 can be energized only by RUN/TOW switch 210 = TOW. Electric brake has a manual override to mechanically release spring. |
| FNR SWITCH 230 (FWD/NEUTRAL/REV) | FWD | Enables drive logic power and selects forward drive direction. Forward speed is 100% of maximum motor speed. (4650 rpm) |
| | NEUTRAL | Disables logic power to the motor controller 120. De-energizes the electric brake 180. |
| | REV | Enables drive logic power and selects reverse drive direction. Sound reverse alarm 250. Reverse direction speed is 60% maximum motor speed. (2790 rpm). |

AC drive system 100 may include several exemplary drive outputs generated by motor controller 120. For example, a reverse alarm output may be generated by controller 120 to activate the reverse alarm 250 when the key switch 220 is in RUN and the FNR switch 230 is in REV, and the run/tow switch 210 is selected to RUN, for example. Motor controller 120 may disable the reverse alarm 250 when the key switch 220 is selected to ON or when the run/tow switch 210 is selected to TOW.

Drive output logic may be provided to the electric brake 180. Drive output logic of motor controller 120 may enable electric brake 180 to a maximum activation voltage, such as 48 volts, for one second and then drop to 40% PWM thereafter when the run/tow switch is selected to TOW, or when the key switch 220 is selected to ON, the FNR switch 230 to FWD or REV, and throttle enable sensor 177 is in a drive mode, and actual motor speed is 0 RPM, for example. These are only exemplary conditions, other conditions may be applicable within the ordinary skill of the art.

AC drive system 100 may provide drive output logic to control the main contactor. Drive output logic may enable the main contactor at a selected maximum voltage, such as 36 volts (or other voltages), for one second and then drop to 40% PWM thereafter when the run/tow switch 210 is selected to TOW, or when the run/tow switch 210 is selected to RUN, the key switch 220 is ON and FNR switch 230, selected to FWD or REV, and the throttle enable sensor 177 is in drive mode. Controller 120 may disable the main contactor at 0 volts when the RUN/TOW switch 210 is selected to RUN and the key switch 220 is selected to OFF, FNR switch 230 is FWD or REV and the throttle enable sensor 177 position is in a drive mode, for example.

Drive output logic may also be provided for controlling the locking differential 194. Logic may enable the locking differential 194 to engage at a selected maximum voltage such as 12 volts, for example, for one second and then drop to 40% PWM, or other selected intermediate voltage, thereafter. Conditions for engaging locking differential 194 may be satisfied if the RUN/TOW switch 210 is selected to RUN, or if the key switch 220 is selected to ON and FNR switch 230 to FWD and REV, and the throttle enable sensor 177 is in drive mode and actual motor speed is greater than 0 RPM, for example. Drive output logic may disable the locking differential 194 at 0 volts, if the run/tow switch 210 is selected to TOW and the key switch 220 is selected to OFF, or if the key switch 220 is selected to ON, the FNR switch 230 to FWD or REV, the throttle enable sensor 177 is in pedal-up mode and actual motor speed is 0 RPM, for example. These are merely exemplary conditions to engage/disengage the locking differential 194, other conditions may be set within the ordinary skill of the art.

Table 2 summarizes the drive outputs from the logic of motor controller 120.

TABLE 2

Drive Outputs

| Output | Position | Function |
| --- | --- | --- |
| Reverse Alarm 250 | Enabled | 12 V when Key switch 220 = ON, FNR switch 230 = REV and when RUN/TOW switch 210 = RUN |
| | Disabled | 0 V when Key switch 220 = ON, FNR switch 230 = FWD or REV or when RUN/TOW switch 210 = TOW |
| Electric Brake 180 | Enabled | 48 V for 1 second and then drop to 40% PWM thereafter when RUN/TOW switch 210 = TOW or Key switch 220 = ON and FNR switch 230 = FWD or REV and Throttle enable sensor 177 = drive, or actual motor speed >0 rpm) |
| Main Contactor | Enabled | 36 V for 1 second and then drop to 40% PWM thereafter when RUN/TOW switch 210 = TOW or RUN/TOW switch 210 = RUN and Key switch 220 = ON, FNR switch = FWD or REV and throttle enable sensor 177 = drive. |
| | Disabled | 0 V when RUN/TOW 210 = RUN and Key switch 220 = OFF or RUN/TOW 210 = RUN and Key switch 220 = ON, FNR switch 230 = FWD or REV and throttle enable sensor 177 = pedal-up. |
| Locking Differential | Enabled | 12 V for 1 second and then drop to 40% PWM thereafter when RUN/TOW = TOW or Key switch = FWD or REV and (Throttle enable sensor 177 = drive or actual motor speed >0 rpm) |
| | Disabled | 0 V when (RUN/TOW 210 = RUN and Key switch 220 = OFF) or Key switch = ON, FNR switch 230 = FWD or REV and throttle enable sensor 177 = pedal-up and actual motor speed = 0% (0 rpm) |

Communication between intelligent devices such as the motor controller 120, battery pack 130, charger 140, external network 150 and various sensors and actuators such as throttle 170, electric brake 180, service brake pedal 160, etc. may be provided via controller area network CAN bus 145 and associated CAN connector interfaces. For example, a CAN chip with high, low, and ground pins may be provided in a suitable drive connector at the motor controller 120. As will be described in further detail below, communication protocol may be a suitable CAN protocol such as CAN open 2.0B or compatible protocol. The CAN bus interfaces within AC drive system 100 may provide an intermittent diagnostic ability via external network 150 as well as communication with charger 140, for example. Data may be exchanged between the various components of the AC drive system 100 and stored within motor controller 120. Such data may include, but is not limited to, drive errors, warnings and fault codes, battery state of charge, battery voltage, number of charge cycles, amount of run times and charge, total drive time and total logic power time, for example. Although a CAN bus has been described as an exemplary bus architecture, the exemplary embodiments may employ alternative bus architectures. Other suitable bus architectures may include, but are not necessarily limited to: RS 232, RS 422, USB, serial, parallel, wireless, Bluetooth and/or optical buses, for example.

AC Motor

Referring again to FIG. 1, motor 110 may be configured as a three-phase, four-pole, AC motor, such as an induction motor or permanent magnet motor. Such motors may be brushless. Internally, motor 110 may include a wound stator and a permanent magnet rotor. Having the windings in the stator may help to efficiently dissipate winding heat. The stator windings may be connected in a three-phase wye configuration, for example, here shown as the three drive phases U, V and W (embodied as wires U, V and W in FIG. 1). The rotor may consist of a shaft and a core with rare earth permanent magnets, its circumference providing inherent low inertia.

In general, rotor motion may be started by generating a revolving magnetic field in the stator windings which interacts with permanent magnet fields in the rotor. The revolving field may be created by sequentially energizing winding phase pairs of the three drive phases U, V and W. The winding phase pairs may be energized with current flow in a given sequence to produce the desired direction of rotation. At any instant, two of the three phases may be energized while the third phase is off. Energizing two phases simultaneously combines the torque output of both phases.

The AC drive system 100 may run off of a DC voltage source, for example, but has a slightly more complicated commutation logic than a brushless DC drive system. In the AC drive system 100, the power to each phase may be turned on and off gradually by using pulse width modulation (PWM).

In general, PWM is modulation in which a duration of pulses is varied in accordance with some characteristic of the modulating signal. As an example, a pulsing semiconductor or pulse width modulator such as a FET (commonly used in the electronics industry) may create a desired voltage that is proportional to the duty cycle, and which causes power to a given phase to be turned on or off. Alternatively, pulse frequency modulation could be used to create this desired voltage. In either case, the FET may be switched between the ON and OFF states to create a desired voltage that is proportional to the duty cycle at which it is switched.

Use of an AC motor 110 in vehicle 190 may provide a motor that requires less maintenance, has a substantially long life, low EMI, and substantially quiet operation. An AC motor such as the illustrative motor 110 may produce more output power per frame size than PM or shunt-type DC motors and gear motors. The low rotor inertia of motor 110 may provide improved acceleration and deceleration times while shortening operating cycles, and the linear speed/torque characteristics of brushless AC motors such as motor 110 may produce predictable speed regulation. Further, with brushless AC motors the need for brush inspection is eliminated, making them ideal candidates for limited access areas such as a golf car and applications where servicing may be difficult.

Motor Controller

Motor controller 120 may be embodied in hardware and/or software as one or more digital microprocessors that may be provided on a printed circuit card, for example. However, instead of a digital microprocessor, motor controller 120 may be embodied as an analog processor, digital signal processor and/or one or more application specific integrated circuits controlled by a suitable microcontroller or microprocessor (not shown).

Controller Area Network (CAN)

A controller area network (CAN) is a high-integrity serial data communications bus for real-time applications. A CAN may operate at data rates of up to 1 Megabits per second (Mbps) and has excellent error detection and confinement capabilities. CANs may be typically used in automotive control applications, industrial automation and control applications, for example.

Referring to FIG. 1, CAN bus 145 may be a serial bus system especially suited for networking intelligent devices such as motor controller 120, as well as sensors and actuators within system 100, although other bus architectures may be suitable as previously described above. In general, a CAN bus is a serial bus system with multi-master capabilities, that is, all CAN nodes may be able to transmit data and several CAN nodes may simultaneously request the CAN bus 145. The serial bus system with real-time capabilities is the subject of the ISO 11898 international standard and covers the lowest two layers of the ISO/OSI reference model. In controller area networks, there is no addressing of subscribers or stations in the conventional sense, but instead, prioritized messages may be transmitted.

In general, a transmitter in a CAN may send a message to all CAN nodes. Each node may decide, on the basis of a received identifier, whether it should process the message or not. The identifier may also determine the priority that the message enjoys in competition for CAN bus 145 access. The relative simplicity of the CAN protocol may mean lower cost, CAN chip interfaces make applications programming relatively simple.

The CAN chips envisioned for AC drive system 100 may be commercially available, low-cost controller chips. Such controller chips may implement the CAN data link layer protocol in a suitable material such as silicon and may be configured for simple connection to microcontrollers such as motor controller 120 or to a suitable controller of charger 140, for example.

A feature of the CAN protocol is its high transmission reliability. A CAN controller, which may be suitably embodied as a chip on an integrated circuit board with motor controller 120, for example, registers station errors and evaluates the errors statistically in order to take appropriate measures. These measures may extend to disconnecting a given CAN node that is the source of the errors, for example. Further, each CAN message may transmit from 0 to 8 bytes of information. Of course, longer data information may be transmitted by using segmentation, as is known. The maximum transmission rate specified in ISO11898 is 1 Mbit/s. This data rate applies to networks up to 40 meters. For longer distances, the data rate may be reduced; for example, for distances up to 500 m, a speed of about 125 kbit/s is possible, and for transmissions up to 1 km a data rate of at least about 50 kbit/s is possible.

Figure 3:
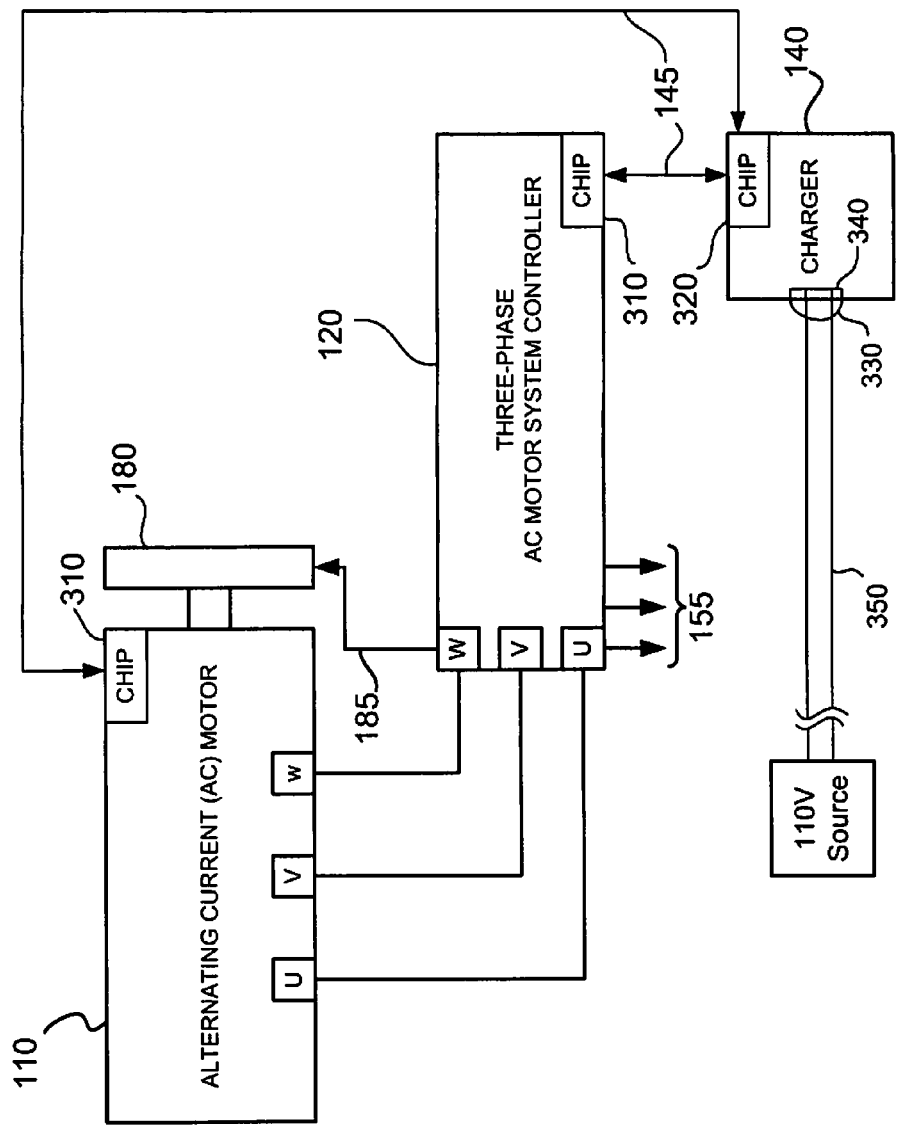
FIG. 3 is a block diagram illustrating an arrangement of CAN communication chips in accordance with various embodiments.

FIG. 3 is a block diagram illustrating an arrangement of CAN communication chips in accordance with various embodiments. Referring to FIG. 3, a suitable CAN communication chip 310 may be installed in the motor drive at either the motor 110 or motor controller 120 on vehicle 190. A second CAN communication chip 320 may be installed in the charger 140, which may be typically mounted in the vehicle recharge area, such as where vehicles are parked during down-time or at night, and connected to a 110 V outlet. A DC charger plug 330 may be connected to the charger receptacle 340 of vehicle 190 for recharging the battery pack 130 as needed, which may be nightly for example. One or more of a DC charger cable 350, plug 330 vehicle charger receptacle 340 and a vehicle wire harness (not shown) for vehicle 190 may contain a dedicated CAN high, low and in-ground signal wires. When connected for charging, these connections may thus form the CAN bus 145 that links the motor controller 120 to the charger 140 and other intelligent devices for data exchange, for example.

As discussed above, motor controller 120 may record and store information in a suitable memory or storage as the vehicle 190 is used. Examples of a built-in memory medium may include, but are not limited to, rewritable non-volatile memories, such as ROMs, flash memories, and hard disks. Examples of removable storage media may include, but are not limited to, optical storage media such as CD-ROMs and DVDs, magneto-optical storage media, such as MOs, magnetism storage media such as floppy disks, cassette tapes and removable hard disks, media with a built-in rewritable non-volatile memory such as memory cards, and media with a built-in ROM, such as ROM cassettes for example.

Typical data stored in the associated memory or storage of the motor controller 120 for later exchange with the charger 140 may include, but are not limited to, drive time in forward, drive time in reverse, logic time on (i.e., KEY ON time for key switch 220, the time that logic power is applied to motor controller 120), various warnings, conditions and faults, the battery pack 130 SOC, amp-hours consumed and voltage data, and data to assist in operating charger 140. The communication data exchange over CAN bus 145 may be bi-directional, i.e., the charger 140 may also send data to the motor controller 120. This functionality may provide a means to change parameters of an entire vehicle fleet which would enable optional services purchased for an entire vehicle fleet for any number of single cars vehicles 190 in the fleet.

Any number of chargers 140 may be connected to form a larger controller area network, for example. Any CAN-supportable external network 150 such as a Dongle, a laptop computer, a handheld computer or server may also be connected to the CAN bus 145 to provide a system where data exchange between the remote CAN-supported computer and any vehicle 190 in the fleet may be made, for example. Accordingly, bi-directional data exchange via CAN bus 145 may provide an ability to rotate a vehicle fleet to maintain even vehicle 190 usage, and/or may provide an ability to warranty the vehicle 190 based on usage (i.e., hours, mileage) for example. Further, bi-directional data exchange via CAN bus 145 may provide an ability to predict service needs and to collect data on course use, duty cycle, thermal cycles, driving styles, etc.

Battery pack 130 may include a plurality of battery cells connected in series (i.e., a 48Vdc electric power via four serially-connected 12Vdc batteries) to power vehicle 190. Pack 130 may be embodied as any of a lithium ion (Li+), nickel cadmium (NiCd), nickel metal hydride (NiMH), or lead-acid battery pack, for example, in terms of the chemistry makeup of individual cells, electrodes and electrolyte of the pack 130.

In other various embodiments, motor controller 120 may be configured to determine an ideal amount of power to return to the vehicle's battery pack 130 by monitoring the energy applied to the motor 110 during vehicle 190 operation since the last charge cycle, in order to determine the state of charge (SOC) for the battery pack 130, as a percentage value. Based on the SOC, the motor controller 120 may provide data to charger 140 so charger 140 can return energy to battery pack 130 in accordance with or in proportion to the SOC when the charger 140 is operatively connected to the vehicle 190.

For example, the motor controller 120 may sum the amount of energy consumed during operation of the vehicle 190 since the last known charge cycle. The energy removed may be subtracted from a given last known charge cycle, thereby determining a battery pack 130 state of charge (SOC). A given amount of energy equal to a ratio of energy removed to energy returned to the battery pack 130 may be calculated by suitable software within motor controller 120 or another intelligent device, such as charger 140. This ratio may be optimized in relationship to the amount of drive system efficiencies, battery pack type, battery pack age, and the rate of energy consumption, for example, although other parameters may be used for optimization of the ratio of energy removed to energy returned to the battery pack 130. This may be proportional to the internal resistance of battery pack 130.

Another aspect of the exemplary embodiments may be directed to an electrically actuated brake 180, also occasionally referred to herein as a parking brake 180 or an electric brake 180 and which is configured to apply a braking torque or braking pressure to motor 110. Parking brake 180 may be actuated when the brake pedal 160 of the vehicle 190 is at a maximum stroke. The brake 180 may be a brake by wire design that may include a brake pedal position sensor 163 and brake full stroke sensor 165, as shown in FIG. 1, each configured to provide an analog signal input to controller 120 over signal line 122 that is converted to a digital signal in the A/D converter of the motor controller 120, as previously described. Accordingly, electric brake 180 can be actuated by the motor controller 120 based on either or both of the brake pedal position sensor 163 and brake full stroke sensor 165 inputs.

Referring to FIG. 1, and during normal driving situations, the electric brake 180 may be powered to a released position by the motor controller 120. Brake pedal sensor 163 determines the position of brake pedal 160 to vary the electrical energy applied to electric brake 180 by providing an input to motor controller 120 via signal line 122 which, based on the input, sends a digital command such as a brake control signal to electric brake 180 over signal line 185, as shown in FIG. 1. When brake pedal 160 is depressed to within about 5% of the maximum brake pedal stroke as indicated by brake full stroke sensor 165 (analog signal) input, for example, power to electric brake 180 may be directly interrupted (i.e., controller 120 is bypassed) to effect a parking or emergency brake function. Once this circuit is open, power is removed from the electric brake 180 and a friction material is spring applied to the disk. The springs of electric brake 180 are sized to apply a pressure to the friction material, providing a braking torque equal to or greater than about 120% of the motor 110 maximum dynamic torque. This action reduces the motor speed toward zero until the vehicle 190 reaches zero speed, or until the brake full stroke sensor 165 is deactivated, i.e., when the user releases the brake pedal 160 greater than a predetermined distance from its full stroke or fully applied position, such as the aforementioned 5% of the maximum brake pedal stroke by way of example. As an alternative, motor controller 120 can utilize the brake full stroke sensor 165 independently of the brake pedal sensor 163 to apply electric brake 180 and initiate a parking brake function using only that input. The system may further be configured so that activating the brake pedal 160 at zero speed releases the electric brake 180 and holds vehicle 190 stationary. At any time where the pedal 160 is released, which deactivates the brake full stroke sensor 165, normally commanded vehicle driving may resume.

The brake pedal position sensor 163 may be used for service braking by commanding a given motor speed reduction per unit time. The position of brake pedal 160 as sensed by brake pedal sensor 163 provides an input to motor controller 120 to determine the deceleration rate of vehicle 190. The electrically operated brake 180 may be a motor shaft mounted, spring applied and electrically released disc brake, for example. The electric brake, 180 may also assist on downhill braking.

In accordance with the position of brake pedal 160, the brake pedal position sensor 163 may send the motor controller 120 a signal to reduce the motor speed and induce a braking torque that is proportional to the pedal position. The braking torque may be minimal with minimal brake pedal 160 depression, and may be at a maximum at the full brake pedal 160 depression, for example.

The brake full stroke sensor 165 may complement, but would not replace an emergency stop, which may be activated by turning the key switch 220 to the off position, thereby positively stopping the vehicle 190. The brake full stroke sensor 165 may thus function as redundant safety switch, and may be provided to maintain a safe driving condition where the vehicle 190 is stopped in a panic or unforeseen single emergency event. Such an event can include interruption of operation of motor controller 120, failure, operator error and/or other external events, for example.

In another aspect, motor controller 120 may be configured to provide an automatic park braking function. In order for the motor controller 120 to determine when to automatically engage the parking brake 180, the motor controller 120 may monitor the motor commanded speed, actual speed, key switch position, throttle and brake conditions, for example.

There may be several possible conditions that could cause the motor controller 120 to automatically engage the parking brake 180. For example, one condition may occur when the vehicle 190 is coasting, without any command from either the accelerator (throttle 170) or the brake pedal 160. For this condition to exist, the vehicle 190 is moving, and the key switch 220 is selected to ON and the FNR switch 230 is in FWD position. Based on these input conditions, motor controller 120 may reduce the motor speed by a given amount per unit time, which may be referred to as "neutral braking." If vehicle 190 remains in this condition, and the actual motor speed is within a given range near zero speed, motor controller 120 may remove power from the electric brake 180 and the parking brake 180 may be commanded to be set. After a given time, the motor controller 120 may disable the motor 110. If the motor controller 120 detects actual motor speed above the given range near zero speed, motor controller 120 may attempt to prevent the motor 110 from rotating, maintaining the vehicle 190 at a stop.

Another condition may occur if the brake pedal 160 is depressed a sufficient time to bring the vehicle 190 to a complete stop, then the parking brake 180 is engaged. A complete stop may be defined as a given range of speed near zero speed, for example. For this condition to exist, the vehicle 190 may be commanded to a stop by depressing the brake pedal 160, the key switch 220 is ON, and the commanded speed and actual speed are at 0 RPM or within the given speed range near zero speed. Based on these inputs, motor controller 120 may command the electric brake 180 to engage. After a given time has elapsed, motor controller 120 may disable the motor 110. If the motor controller 120 detects that actual motor speed above the given range near zero speed, motor controller 120 may attempt to prevent motor 110 from rotating, maintaining the vehicle 190 at a stop.

Another condition may occur if any error in the logic inputs to AC drive system 100 exist, if a sensor is out of range, or if the motor controller 120 faults due to any of an over-current, over-voltage, under-voltage, over-temperature, or under-temperature condition, for example. Each fault condition may have a unique outcome in terms of precautionary measures or reactions under the control of motor controller 120, including, but not limited to, signaling warning codes via meter 240 or warning lights on the LED 245 of the instrument panel, reducing motor 110 performance for continued drive operations, immediate shutdown, and the like. These fault conditions may occur at any vehicle speed or under any operator condition where the motor controller 120 detects one or more of the aforementioned fault conditions. In this example, motor controller 120 may take the precautionary action of commanding zero motor speed and then engaging the parking brake 180 (via a brake control signal over signal line 185) within a short period or immediately, and may disable motor 110 in some more extreme cases, for example.

Another condition may occur if the key switch 220 is set to the OFF position. Motor controller 120 may engage the electric brake 180 in any case where the key switch 220 is set OFF, regardless of any other input condition, including vehicle 190 speed. This may provide a necessary safety function as the key switch 220 is also the operator's only emergency stop switch on vehicle 190.

Other various embodiments enables the motor controller 120 to provide a pedal up braking or neutral braking function based on given monitored inputs, in order to detect an implemented desired braking condition when the brake pedal is not engaged. By pedal up braking, while the vehicle accelerator pedal 170 is released, motor controller 120 may actively implement a regenerative braking situation to decrease vehicle 190 speed down to a base speed of the motor 110. Thus, pedal up or neutral braking may represent an ability of the vehicle 190 to reduce the vehicle speed by a given amount per unit time, when neither the brake pedal 160 nor the accelerator pedal (throttle) 170 is engaged, independent of vehicle slope (e.g., the slope of the vehicle on a hill or incline).

During normal operation of the vehicle 190, motor controller 120 may monitor several operator inputs and vehicle conditions. For example, brake pedal position, accelerator pedal position, and actual motor speed may be monitored by motor controller 120 to enable the implementation of pedal up braking. When the accelerator pedal 170 and brake pedal 160 are not engaged by the operator, and the vehicle 190's actual motor speed is determined to be in a given range, motor controller 120 may command the motor 110 to reduce speed by a given amount per unit time, for example. This reduction of motor speed for unit time may continue until the input conditions or until the motor speed reaches a near zero speed condition. If a near zero motor speed is encountered, motor controller 120 may command the engagement of the automatic parking brake feature, reducing actual motor speed and stopping the vehicle 190. Accordingly, by virtue of automatically reducing the vehicle speed, even on a downhill slope, pedal up braking in accordance with various embodiments may provide an additional measure of safety to the vehicle 190 operation.

Other various embodiments are directed to the implementation of a tow mode. In the tow mode, motor controller 120 may be configured to limit the maximum towing speed of vehicle 190 and to control motor 110. This is so that motor 110 neither consumes power nor generates power while vehicle 190 is being towed.

The tow mode may be selected by setting the key switch 220 to the ON position, the FNR switch 230 to the REV position, and selecting the TOW position on the run/tow switch 210. As discussed above, the run/tow switch 210 may be located on the vehicle 190 at a place that is convenient for towing, yet a location where the switch 210 may not be easily activated from the operator's (or passenger's) position. This may provide reasonable assurance that the run/tow switch 210 will not be purposefully or inadvertently cycled during normal driving evolutions of the vehicle 190.

One function of the tow mode may be to limit the vehicle 190 speed to, by way of example, 15 miles per hour, as specified by ANSI Z130. Selecting the key switch 220 to an ON condition enables the logic power to the motor controller 120. Selecting the TOW position on the run/tow switch 210 may deactivate the electric parking brake 180, in order to prepare the vehicle 190 for towing. The service brake pedal 160 may function normally while vehicle 190 is in the tow mode. In some configurations the FNR switch 230 may be set to a preferred position.

As logic supplied to the motor controller 120 is activated by a key ON condition, motor controller 120 may monitor the actual towing speed of the vehicle 190. This may be accomplished via a feedback signal from the motor 110 or from a wheel 198 to the motor controller 120. The motor signal may be provided by a suitable motor speed encoder, wheel speed encoder, sensor-less device and/or by monitoring the frequency or voltage of the motor 110. Based on these inputs, motor controller 120 may calculate that the vehicle 190 has reached a speed equal to, by way of example, 15 MPH±some given error tolerance. Motor controller 120 may then attempt to resist vehicle motion by commanding the vehicle 190, via motor 110 and/or electric brake 180 to decelerate to, by way of example, 15 MPH.

Another function of the tow mode may be to assist towing so as to have a negligible effect on the state of charge of the battery pack 130. For example, while the vehicle 190 is in tow, the motor controller 120 may monitor current between the battery pack 130 and motor controller 120. Motor controller 120 may then command the motor speed or torque to deliver a net consumption of zero (0) amps battery current to offset back EMF with forward EMF. Current is limited because the motor controller 120 can only turn the rotors so quickly. Although zero amps consumption may not be obtainable in actuality, the allowable error of the AC drive system 100 may facilitate the towing function, with the positive and negative current to and from the battery pack 130 having a negligible effect on the battery pack 130's overall SOC condition. Further, while the vehicle is in the tow mode, controller 120 may selectively activate the brake 180 to limit tow speed below a predetermined value, such as a predetermined motor revolutions per minute, such as 4800 RPM. Such a tow speed may be determined in accordance with the ability of controller 120 to operate motor 110.

Figure 4:
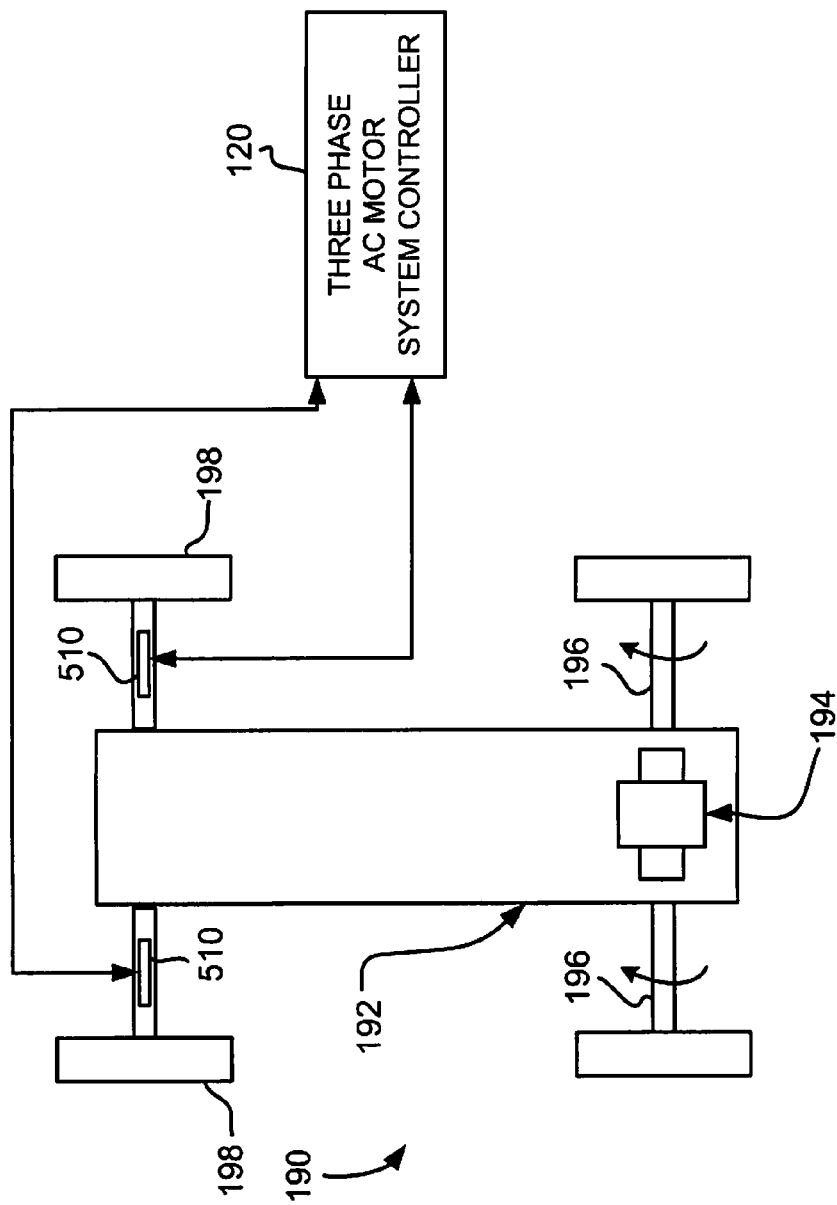
FIG. 4 is a block diagram illustrating a front wheel speed sensor in accordance with various embodiments.

FIG. 4 is a block diagram illustrating a front wheel speed sensor in accordance with various embodiments. Referring to FIG. 4, another embodiment may be directed to a front wheel speed sensor 510. The front wheel speed sensor 510 may enable implementing one or both antilock braking and traction control features on a vehicle 190 such as a golf car or small utility vehicle. Traction control and antilock braking may limit the ability for driven and braked wheels to slip with respect to the road surface. Reduction in wheel slip may improve the control of the vehicle 190 by reducing the ability of the vehicle 190 to enter into a skid. These features may greatly reduce vehicle stopping distance in the event of a reduced friction road surface, such as wet grass, for example. When a vehicle's road surface is a turf surface, traction control and antilock braking features may reduce the turf damage by reducing the amount of slip between the wheel 198 and the turf's surface.

Motor controller 120 may monitor the motor speed, which is proportional to the driven wheel speed. Motor controller 120 may include stored pre-programmed data related to the vehicle 190's overall gear ratio, enabling the motor controller 120 to calculate the driven wheel speed, for example.

As shown in FIG. 4, a suitable wheel speed sensor 510 may be mounted to a hub of a non-driven and non-braked wheel 198 to measure the wheel speed of a wheel that is not slipping relative to the road or turf surface. The measurable data from the sensor 510 may be used to enable maximum braking and/or acceleration without slipping. This data may be communicated to the motor controller 120 via CAN bus 145, for example. Motor controller 120 may compare the calculated wheel speed of the driven wheel 198 to the wheel speed input from the non-braked wheel 198. Motor controller 120 may then adjust the motor speed to match speed in an effort to reduce the error between the driven and non-driven wheel. Once the error has been reduced, motor 110 may accelerate or decelerate to match the actual motor speed to the commanded motor speed. If additional errors are measured between the non-driven and driven wheels by motor controller 120, motor controller 120 may further adjust the motor speed to reduce the given error within acceptable limits. Such control provides maximum braking or acceleration while minimizing slippage.

Figure 5:
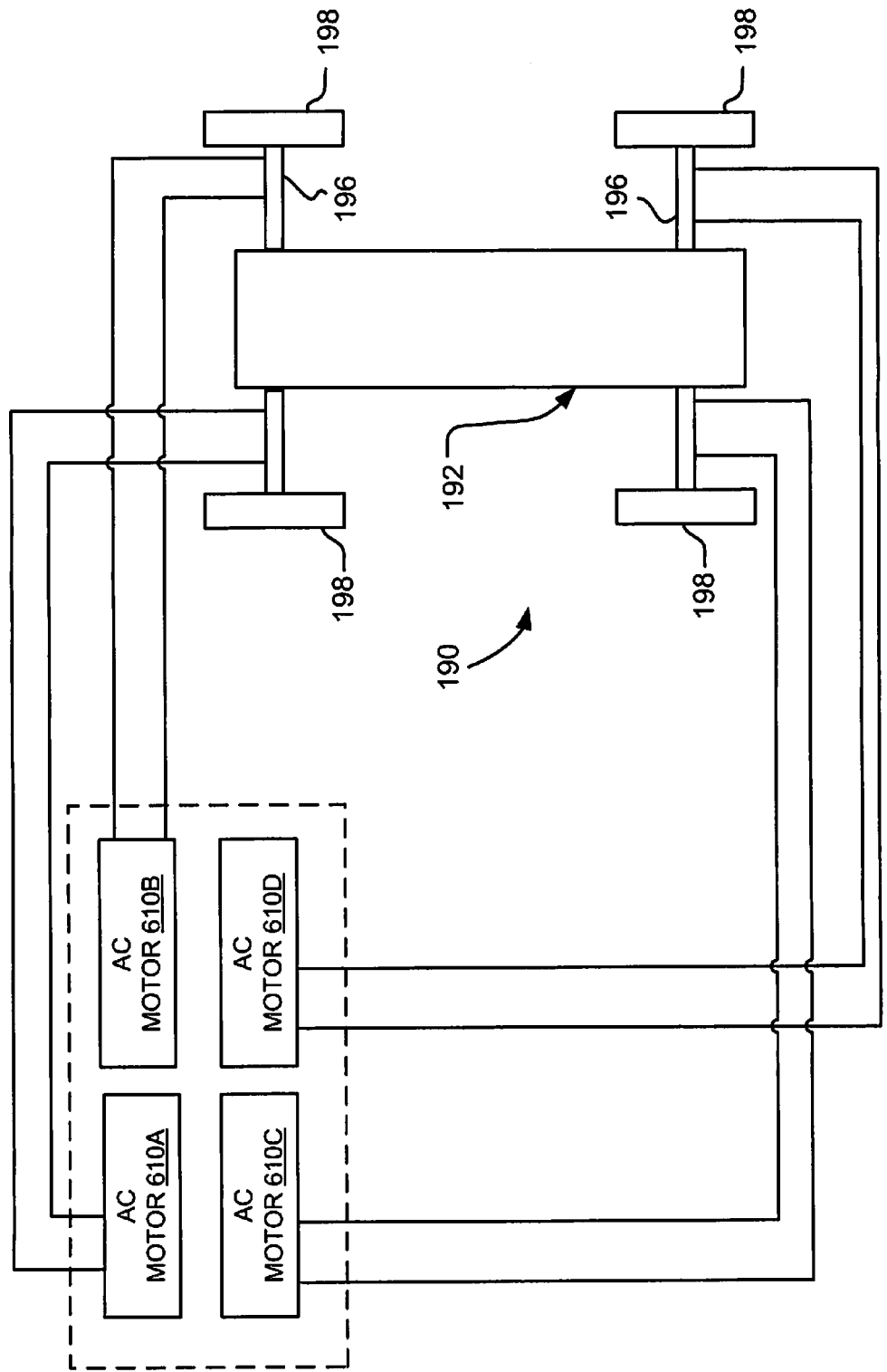
FIG. 5 is a block diagram illustrating a multiple or all wheel drive arrangement in accordance with various embodiments.

FIG. 5 is an exemplary block diagram illustrating a multiple or all wheel drive arrangement in accordance with various embodiments. Although FIG. 1 illustrates other various embodiments in which motor 110 may drive the rear wheels 198 via rear axle 192 and locking differential 194, vehicle 190 could be configured to include a multiple or all-wheel drive system. For example, a tandem motor arrangement or four separate AC motors 610A-D could be provided to power an individual or corresponding wheel 198.

Driving two or more wheels of vehicle 190 independently may provide several advantages over the common solid axle conventionally used in vehicles such as golf cars. For example, the differential carrier may be eliminated. Eliminating the differential 194 may eliminate mechanical losses associated with mechanically differentiating wheel speed. By providing a sensor-based steering direction and then powering the wheels with unequal torque or speed, the steering system may be assisted in steering the vehicle, possibly reducing the steering effort. Additionally, directly driving two wheels may provide the functionality of a differential lock. This feature may generally provide for additional tractive or braking effort. Further, with two-wheel or all-wheel drive, the solid beam axle 192 may be eliminated to facilitate an independent rear suspension. Accordingly, each wheel could be driven by corresponding brushless AC motor 610A-D, each motor 610A-D providing 30 outputs. Further, each wheel could optionally include a corresponding speed sensor 510 as shown in FIG. 4, for example. Alternatively, instead of a 4-motor configuration, a tandem configuration is envisioned, where one AC brushless motor (610A or 610B) drives the front wheels, and another AC brushless motor (610C or 610D) drives the rear wheels.

By driving each wheel of vehicle 190 with two to four separate motors 110, independent braking of the wheels may be conducted as needed to enhance traction during vehicle acceleration or braking and independent driven wheel speeds may be measured with the front wheel sensor. The sensor may be installed in the motor 110, for example. Additionally, such an arrangement may provide redundant operation in the event of a inoperability of a motor; the vehicle 190 may remain operational with only motor system. Further, motor size may be reduced while providing equal or enhanced vehicle 190 performance. Reduced power levels may make direct drive motors such as the brushless AC motor 110 described herein more technically feasible and economical. Finally, unsprung weight may be reduced, thereby improving drive quality via the suspension system.

Accordingly, the use of an AC drive system in a vehicle such as a golf car and/or a small utility vehicle may provide several distinct advantages where precise position control is not a main objective and/or where an AC current source is not readily available, but may be simulated using a three-phase power inverter and a DC battery pack 130.

For example, the drive efficiency of selected AC motors may far exceed a typical series DC motors, or separately excited armature and field (shunt-type) DC motor. This higher efficiency may enable the vehicle 190 to operate longer and to travel further on a smaller battery pack 130.

Additionally, peak motor torque may be available at zero motor RPM, thereby enabling the motor 110 to hold the vehicle 190 in place This may prevent the vehicle 190 from moving in certain safety-critical situations for a long enough duration to enable the parking brake 180 to be engaged and to avoid vehicle rollaway, for example.

Further, motor 110 may be controlled by motor controller 120 so as to produce a control torque in either rotational direction. This may enable the motor 110 to be used use as a service brake, thereby eliminating the need for a mechanical service brake, for example. Enabling the AC drive system 100 to act as the vehicle service brake may convert a percentage of the vehicle 190's kinetic energy to electric potential energy, thereby providing the ability to the charge the associated, battery pack 130. Moreover, use of a motor 110 as a service brake reduces the heat energy produced by using a mechanical service brake. The elimination of this heat during service brake may enable the use of the lower temperature plastics for body panels, components and wheels on the vehicle 190, for example. Still further, a smaller, lighter motor may be used due to the high efficiency of brushless permanent magnets or induction motors, as compared to series or shunt-type DC motors.

The description herein is merely exemplary in nature and, thus, variations that do not depart from the gist of that which is described are intended to be within the scope of the disclosure. Such variations are not to be regarded as a departure from the spirit and scope of the disclosure.

The invention claimed is:

1. A drive system for a vehicle, comprising:
    a motor for providing a drive torque to the vehicle via an output shaft;
    an electrically actuated brake mounted to the output shaft for providing a braking torque to the output shaft; and
    a controller that receives a battery voltage input, a throttle pedal position input, a brake pedal position input that indicates a position of a brake pedal, a key switch input, a forward/neutral/reverse (FNR) input, and a brake pedal full-stroke input that indicates a full-stroke position of the brake pedal, the controller generating a drive signal for the motor based on the inputs;
    wherein the controller sends a signal to the electrically actuated brake based on at least one of the brake pedal position input and the brake full-stroke input.

2. The drive system of claim 1 wherein the motor includes one of an induction motor and a permanent magnet motor.

3. The drive system of claim 2 wherein the motor includes a wound stator and a permanent magnet rotor.

4. The drive system of claim 1 wherein the controller further includes a media drive for receiving removable storage media including Compact Discs (CDs), Digital Versatile Discs (DVDs), magnetic media, and memory cards.

5. The drive system of claim 1 wherein the controller further receives a throttle enable input.

6. The drive system of claim 1 wherein the controller further generates a warning signal.

7. The drive system of claim 1 wherein the controller further generates a status signal that is communicated to a display.

8. The drive system of claim 1 further comprising a rechargeable battery for providing the controller with a source of electrical energy wherein the rechargeable battery type includes one of lithium ion, nickel cadmium, nickel metal hydride, and lead-acid.

9. The drive system of claim 8 wherein the motor controller recharges the rechargeable battery with energy received from the motor.

10. The drive system of claim 9 wherein the motor controller determines a percentage of the energy to provide to the rechargeable battery based on battery pack type, battery pack age, and rate of energy consumption.

11. The drive system of claim 1 wherein the motor controller further includes a communication bus interface for communicating data.

12. The drive system of claim 11 further comprising a battery charger that includes a second communication bus interface for communicating a battery state of charge (SOC) with the communication bus interface of the controller.

13. The drive system of claim 1 further comprising a locking differential that receives and redirects the drive torque to a pair of axles.

14. The drive system of claim 13 wherein the locking differential locks and unlocks in accordance with a differential control signal that is generated by the controller.

15. The drive system of claim 1 further comprising a plurality of wheel speed inputs and wherein the drive signal is further based on the wheel speed inputs.

16. The drive system of claim 15 wherein the controller includes at least one of an antilock braking system and a traction control system that receive the wheel speed inputs and limit acceleration and deceleration of the motor.

17. The drive system of claim 16 wherein the traction control system limits the acceleration and deceleration based on comparing wheel speed inputs associated with a respective driven wheel and a non-driven wheel.

18. The drive system of claim 1 comprising a second motor for providing a second drive torque wherein the motor controller communicates a second drive signal with the second motor and wherein the second drive signal is based on an operating condition of the motor.

19. A drive system for a vehicle, comprising:
a motor for providing a drive torque to the vehicle via an output shaft;
an electrically actuated brake mounted to the output shaft for providing a braking torque to the motor shaft; and
a controller that receives a battery voltage input, a throttle pedal position input that varies in accordance with a position of the throttle pedal, a brake pedal position input that varies in accordance with a position of the brake pedal to indicate a commanded vehicle deceleration rate, a key switch input, a forward/neutral/reverse input, and a brake pedal full stroke input indicative of whether the brake pedal has been depressed to a parking brake position, the controller generating a drive signal for the motor based on the inputs;
wherein the electrically actuated brake is operated to effect a parking brake function preventing rotation of the output shaft when the brake pedal full stroke input indicates that the brake pedal has been depressed to the parking brake position.

20. A drive system for a vehicle, comprising:
a motor for providing a drive torque to the vehicle via a shaft;
an electrically released brake for providing a braking torque to the shaft;
a controller that receives a battery voltage input, a throttle pedal position input that varies in accordance with a position of the throttle pedal, a brake pedal position input that varies in accordance with a position of the brake pedal to indicate a commanded vehicle deceleration rate, a key switch input, a forward/neutral/reverse input, and a brake pedal full stroke input indicative of whether the brake pedal has been depressed to a parking brake position, the controller generates a drive signal for the motor based on the inputs,
wherein the controller actuates the electrically released brake to effect a parking brake function preventing rotation of the shaft when the key switch input indicates an OFF condition.

21. The drive system of claim 20 wherein the controller sends an emergency brake control signal to actuate the electrically released brake to effect an emergency brake function stopping rotation of the brake when the key switch input indicates an OFF condition and the vehicle is moving.

22. The drive system of claim 20 wherein the controller sends a parking brake control signal to actuate the brake to effect a parking brake function preventing rotation of the motor shaft when the key switch input indicates an OFF condition and the vehicle is stopped.

23. The drive system of claim 20 wherein the controller applies the electrically released brake regardless of any input other than the key switch input.

24. The drive system of claim 19, wherein the parking brake position comprises depression of the brake pedal to within a predetermined range of a maximum brake pedal depression position.

* * * * *